H. M. PFLAGER.
CAR TRUCK.
APPLICATION FILED JULY 6, 1917.

1,278,007.

Patented Sept. 3, 1918.
2 SHEETS—SHEET 1.

Inventor
Harry M. Pflager

H. M. PFLAGER.
CAR TRUCK.
APPLICATION FILED JULY 6, 1917.
1,278,007.
Patented Sept. 3, 1918.
2 SHEETS—SHEET 2.
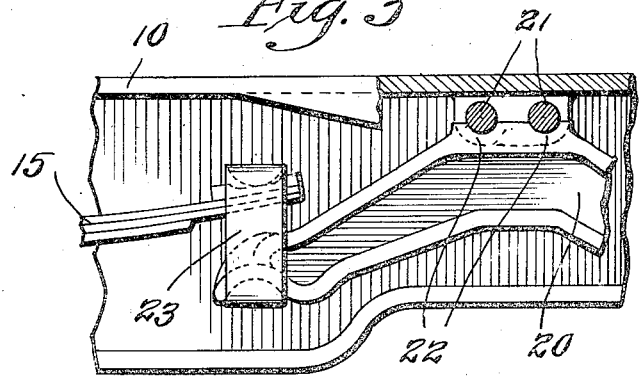
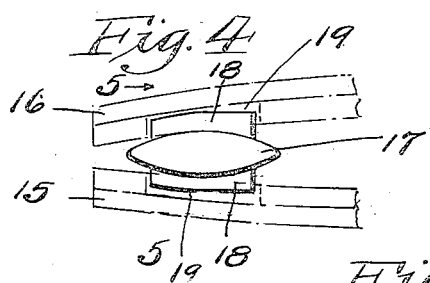
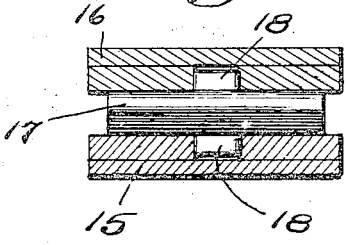
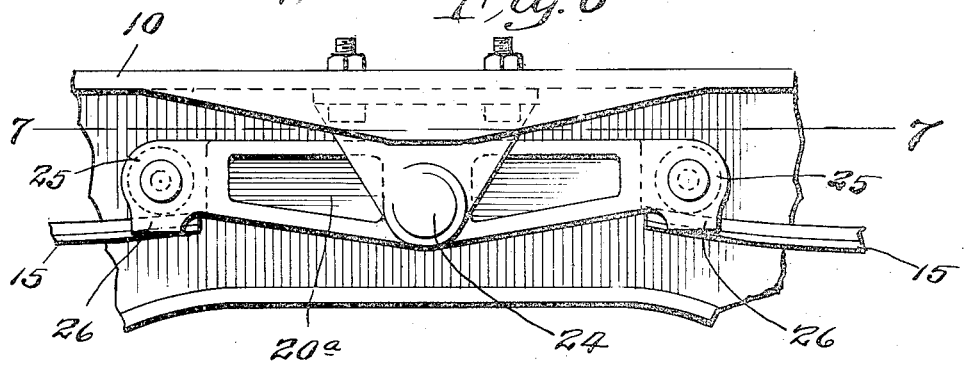
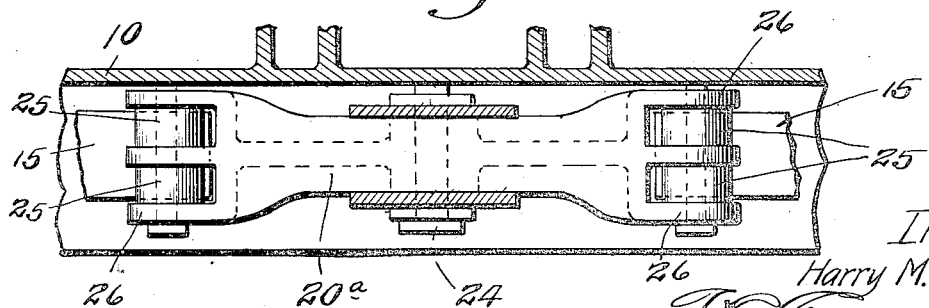
Inventor
Harry M. Pflager
By J. W. Cornwall, Atty.

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR-TRUCK.

1,278,007.　　　　　Specification of Letters Patent.　　Patented Sept. 3, 1918.

Application filed July 6, 1917. Serial No. 179,034.

*To all whom it may concern:*

Be it known that I, HARRY M. PFLAGER, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification.

My invention relates generally to railway car truck construction and more particularly to a new and improved spring and equalizer arrangement for yieldingly supporting the truck frame upon the journal boxes, and this application should be read and considered in connection with Patents Numbers 1,080,555, 1,080,556, 1,080,557, 1,080,558 and 1,080,559, issued to the assignee of Clarence H. Howard and myself December 9, 1913.

The principal objects of my invention are, to generally improve upon and simplify the various spring and equalizer arrangements disclosed in the above mentioned patents; to produce increased flexibility of the truck and equalize the distribution of weight upon all of the truck wheels; to provide a comparatively simple construction for distributing and absorbing the shocks and vibration due to track irregularities and prevent said shocks and vibration from being transmitted to the car body; to arrange the springs and equalizers so that they will in nowise interfere with the free inspection, repair and adjustment of the brakes and brake rigging associated with the truck, and further to utilize in connection with the ordinary semi-elliptic springs and equalizer members, three-quarter elliptic springs, which are particularly effective in materially increasing the flexibility of the spring and equalizer arrangement, consequently absorbing service shocks and vibration to a much greater degree than where the usual semi-elliptic springs are employed.

With the foregoing and other objects in view, my invention consists in certain novel features of construction and arrangement of parts, hereinafter more fully described and claimed, and illustrated in the accompanying drawings, in which—

Fig. 3 is an enlarged side elevational view partly in section and taken approximately on the line 3—3 of Fig. 1;

Fig. 4 is an elevational view of a rocker or bearing member which is interposed between the ends of a pair of leaf springs which form a part of my improved arrangement;

Fig. 5 is a vertical section taken approximately on the line 5—5 of Fig. 4;

Fig. 6 is an elevational view of a portion of the truck frame and showing a modified form of one of the equalizers;

Fig. 7 is a horizontal section taken approximately on the line 7—7 of Fig. 6.

Figure 1:
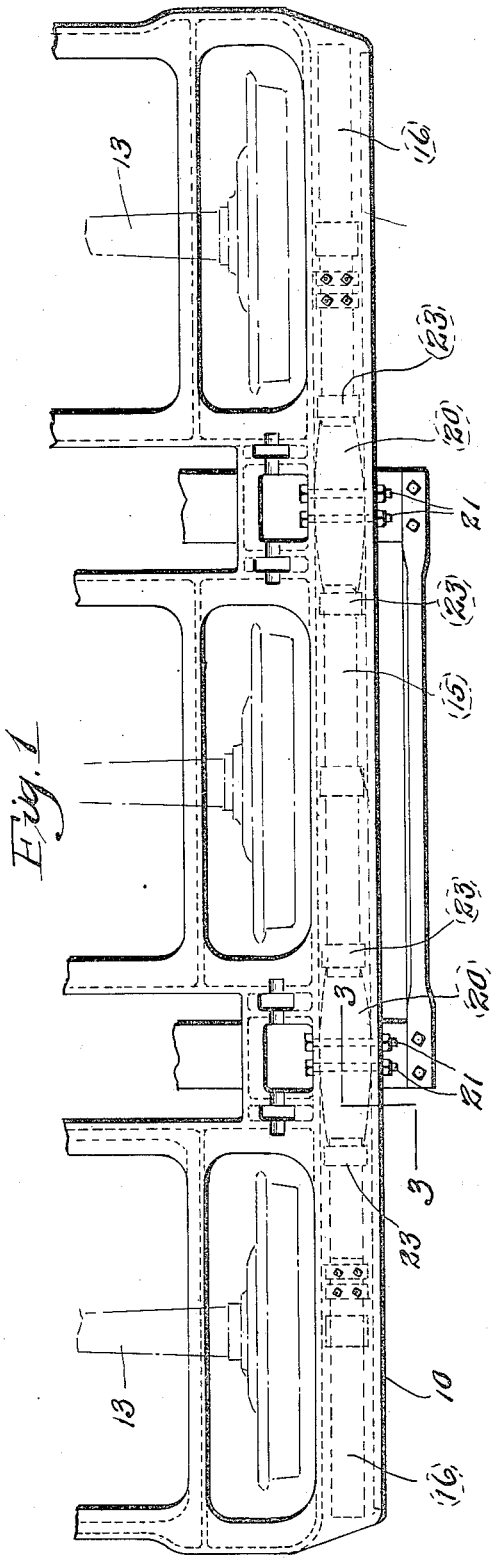
Figure 1 is a plan view of the side portion of a six wheel truck frame with which my improved spring and equalizer arrangement is associated.
Figure 2:
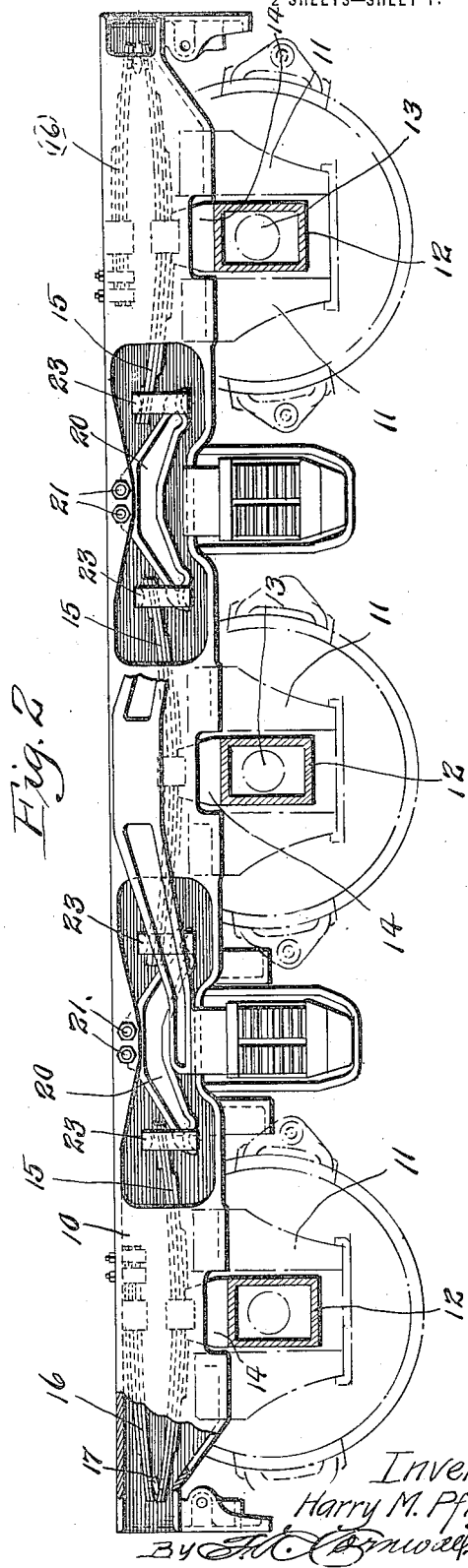
Fig. 2 is a side elevational view of the truck frame and showing my improved spring and equalizer arrangement associated therewith.

Referring by numerals to the accompanying drawings, 10 designates the wheel piece of a truck frame, the latter being preferably of integral construction; 11 the pedestal jaws arranged in pairs and depending from the wheel piece 10; 12 the usual journal boxes; and 13 the usual wheel carrying axles, the ends of which are journaled in the boxes 12.

The wheel piece 10 is preferably hollow and of box-like construction in cross section, the bottom wall of which is preferably cut away at points between the pedestal jaws for the accommodation of the journal boxes, and the outer wall of said wheel piece being cut away at suitable points to permit the ready insertion or removal of the equalizer members and springs constituting my improved construction.

Mounted on the journal boxes 12 are suitable bearing blocks 14, the same extending upward into the space within the hollow wheel piece and mounted on each bearing block is a semi-elliptic spring 15. Each of these springs is balanced upon its supporting block, that is, the band or sleeve which is located at the center of the spring and holds the leaves thereof in assembled relation is mounted on the bearing block, and thus the end portions of each spring project equal distances away from the journal box upon which it is mounted.

Fixed in any suitable manner to the upper portion of the wheel piece 10 and adjacent to the ends thereof are quarter elliptic springs 16, the same overlying the outer portions of the springs 15 which are mounted on the outer pair of journal boxes. Interposed between the adjacent ends of the springs 15 and 16 are rocker blocks 17 which are preferably provided with convex upper and lower faces, and formed integral with the top and bottom of each block are lugs 18 which, when said rocker blocks are properly positioned for use, occupy slots or recesses 19 formed in the end portions of the inner leaves of the springs. (See Figs. 4 and 5.)

By this arrangement, the springs located on the outer pair of journal boxes 12 and the springs 16 combine to form three-quarter elliptic springs between the truck frame and said outer pair of journal boxes, such arrangement being effective in materially increasing the flexibility of the truck supporting means.

Arranged between the three-quarter elliptic springs at the ends of the wheel piece and the half elliptic spring which is mounted upon the middle journal box are equalizing members 20, preferably non-resilient, the central portions of which are fulcrumed upon the upper portion of the wheel piece. Each of these members is preferably provided with two fulcrums 21, the same being in the form of transversely disposed pins or bolts which are seated in the upper portion of the wheel piece and the top of each equalizing member being provided with a pair of seats 22 which receive said fulcrum pins or bolts. By virtue of this construction, each equalizer member maintains its normal position under ordinary service conditions, but in the event of an excessive movement of either one of the springs with which said member is associated it will rock for a limited distance on either one of its fulcrums 21.

Connecting the ends of the equalizer member 20 with the adjacent ends of the springs 15 are loops or hangers 23, it being understood that the ends of said equalizer members occupy positions directly beneath the inner ends of the outer pair of springs 15 and below both ends of the middle one of said springs.

In the modified construction illustrated in Fig. 6, the equalizer member 20ª is provided at or near its center with a single fulcrum 24, the same being preferably a pin or bolt seated in the wheel piece or in a bracket carried thereby, and the ends of said equalizer member are provided with rollers 25 having horizontal axes, and said rollers bearing directly upon the adjacent ends of the semi-elliptic springs. The end portions of this form of equalizer member are preferably extended downward at both sides of the rollers as designated by 26, such extensions providing means for preventing lateral movement of the ends of the springs with respect to the equalizer member.

By my improved spring and equalizer arrangement and particularly the provision of three-quarter elliptic springs between the outer pair of journal boxes and the truck frame, a truck frame supporting structure is provided which is yielding and resilient to a comparatively high degree with the result that service shocks and vibration due to passage of the truck wheels over rough tracks, switches, crossings, and the like are practically absorbed and eliminated. Furthermore, by arranging the springs and equalizer members within the hollow wheel pieces of the truck they are almost entirely inclosed, and consequently protected from injury, and further, such arrangement leaves the brake beams and brake rigging free for inspection and readily accessible in the event of repairs and adjustments.

While I have illustrated and described my invention as being particularly applicable for a six wheel truck, it will be understood that the same arrangement can be advantageously utilized in connection with trucks having other wheel arrangements.

It will be readily understood that minor changes in the size, form and construction of the various parts of my improved car truck can be made and substituted for those herein shown and described, without departing from the spirit of my invention, the scope of which is set forth in the appended claims.

I claim:

1. The combination with a car truck and its journal boxes, of means for yieldingly supporting the truck frame upon the journal boxes, which means includes three-quarter elliptic springs, and an equalizing member associated therewith.

2. The combination with a car truck and its journal boxes, of means for yieldingly supporting the truck frame upon the journal boxes, which means includes three-quarter elliptic springs arranged between certain of the journal boxes and the truck frame, and equalizing members fulcrumed on the truck frame and associated with said springs.

3. The combination with a car truck and its journal boxes, of means for yieldingly supporting the truck frame upon the journal boxes, which means includes springs mounted on the journal boxes, certain of which springs are of the three-quarter elliptic type, and equalizing members fulcrumed on the truck frame and coöperating with the springs.

4. The combination with a car truck and its journal boxes, of means for yieldingly supporting the truck frame upon the journal boxes, which means includes springs mounted on the journal boxes, certain of which springs are of the three-quarter elliptic type, and equalizing members fulcrumed on the truck frame and coöperating with the springs, said springs and equalizing members being disposed within the wheel pieces of the truck frame.

5. The combination with a truck frame and the journal boxes associated therewith, of means for yieldingly supporting said truck frame, which means includes three-quarter elliptic springs interposed between the end journal boxes and the end portions of the truck frame wheel pieces, a semi-elliptic spring supported by the central one of the journal boxes, and equalizing members arranged between and associated with said springs, which equalizing members serve as supports for said truck frame.

6. The combination with a car truck and its journal boxes, of half elliptic springs mounted on the journal boxes, equalizing members fulcrumed on the truck frame and coöperating with said springs, and quarter elliptic springs secured to the truck frame and bearing upon certain of the springs which are supported by the journal boxes.

7. The combination with a car truck and its journal boxes, of means for yieldingly supporting the truck frame upon the journal boxes, which means includes a pair of three-quarter elliptic springs, a semi-elliptic spring, and equalizing members arranged between and coöperating with said springs.

8. The combination with a car truck and its journal boxes, of means for yieldingly supporting the truck frame upon the journal boxes, which means includes three-quarter elliptic springs and a semi-elliptic spring which are mounted upon the journal boxes, and equalizing members arranged between and coöperating with said springs.

9. The combination with a car truck and its journal boxes, of means for yieldingly supporting the car truck upon the journal boxes, which means includes three-quarter elliptic springs, and rocker blocks arranged between the free ends of the members forming said three-quarter elliptic springs.

In testimony whereof I hereunto affix my signature, this 26th day of June, 1917.

HARRY M. PFLAGER.

Copies of this patent may be obtained for five cents each, by addressing the "Commissioner of Patents, Washington, D. C."